(12) United States Patent
Wernlund et al.

(10) Patent No.: US 11,542,741 B1
(45) Date of Patent: Jan. 3, 2023

(54) DRIVE SYSTEMS AND HINGED WINDOW ASSEMBLIES INCORPORATING THE SAME

(71) Applicant: ANDERSEN CORPORATION, Bayport, MN (US)

(72) Inventors: Chad Wernlund, Baldwin, WI (US); David Plummer, Hudson, WI (US)

(73) Assignee: Andersen Corporation, Bayport, MN (US)

( * ) Notice: Subject to any disclaimer, the term of this patent is extended or adjusted under 35 U.S.C. 154(b) by 30 days.

(21) Appl. No.: 17/121,979

(22) Filed: Dec. 15, 2020

Related U.S. Application Data

(62) Division of application No. 15/624,860, filed on Jun. 16, 2017, now Pat. No. 10,865,598.

(60) Provisional application No. 62/352,178, filed on Jun. 20, 2016.

(51) Int. Cl.
| | |
|---|---|
| *E05F 15/614* | (2015.01) |
| *E05F 11/14* | (2006.01) |
| *E06B 3/36* | (2006.01) |
| *E05F 15/611* | (2015.01) |
| *F16H 19/02* | (2006.01) |

(52) U.S. Cl.
CPC ............ *E05F 15/614* (2015.01); *E05F 11/14* (2013.01); *E06B 3/36* (2013.01); *E05F 15/611* (2015.01); *E05Y 2201/68* (2013.01); *E05Y 2201/71* (2013.01); *E05Y 2201/718* (2013.01); *E05Y 2900/148* (2013.01); *F16H 19/02* (2013.01)

(58) Field of Classification Search
CPC ....... E05F 15/614; E05F 15/611; E05F 15/63; E05F 11/14; E05F 11/16; E06B 3/36
See application file for complete search history.

(56) References Cited

U.S. PATENT DOCUMENTS

| | | | |
|---|---|---|---|
| 1,441,229 | A | 1/1923 | Lacey |
| 2,621,543 | A | 12/1952 | Rossmann |
| 3,791,071 | A | 2/1974 | Niklaus |
| 4,159,599 | A | 7/1979 | Richmond |
| 4,497,135 | A | 2/1985 | Vetter |
| 4,553,656 | A | 11/1985 | Lense |
| 4,617,758 | A | 10/1986 | Vetter |
| 4,860,493 | A | 8/1989 | Lense |
| 5,006,766 | A | 4/1991 | Yuhas |
| 5,313,737 | A | 5/1994 | Midas |
| 5,493,813 | A | 2/1996 | Vetter |
| 5,581,939 | A | 12/1996 | Regan |
| 5,813,171 | A | 9/1998 | Piltingsrud |
| 6,128,858 | A | 10/2000 | Vetter |
| 6,915,608 | B2 | 7/2005 | Labarre |
| 7,481,133 | B2 | 1/2009 | Walravens |
| 9,556,664 | B2 | 1/2017 | Hudepohl |
| 2011/0232193 | A1 | 9/2011 | Thorne |

*Primary Examiner* — Gregory J Strimbu

(74) *Attorney, Agent, or Firm* — Mueting Raasch Group

(57) ABSTRACT

Hinged window drive systems and window assemblies incorporating them provide for a combination of powered or motorized operation in addition to manual operation using a hand crank, with the opportunity for a user to switch between motorized operation and manual operation as needed.

12 Claims, 10 Drawing Sheets

DRIVE SYSTEMS AND HINGED WINDOW ASSEMBLIES INCORPORATING THE SAME

RELATED APPLICATION

The present application is a divisional application of U.S. patent application Ser. No. 15/624,860, filed Jun. 16, 2017, which claims the benefit under 35 U.S.C. § 119(e) of U.S. Provisional Patent Application 62/352,178 filed on Jun. 20, 2016, which are hereby incorporated by reference in their entireties.

Drive systems and window assemblies incorporating the drive systems are described herein and offer a combination of powered or motorized operation in addition to manual operation, with the opportunity for a user to switch between motorized operation and manual operation as needed.

BACKGROUND

Hinged window assemblies, such as casement windows, awning windows, etc., include one or more movable sashes in a frame, wherein the movable sash or sashes can be rotated to open and close the window.

SUMMARY

The drive systems and window assemblies incorporating the drive systems as described herein offer a combination of powered or motorized operation in addition to manual operation, with the opportunity for a user to switch between motorized operation and manual operation as needed. The need for manual operation may arise, for example, if the motorized portion of the drive system becomes disabled.

In one or more embodiments, the drive systems described herein may switch between motorized or manual operation without requiring specific knowledge on the part of a user who may or may not have access to automation control devices used to operate the motorized portion of the drive system.

In one or more embodiments, the drive systems described herein may include a linkage driver, driveshaft and output shaft of a motor apparatus, all of which are aligned along a common axis for rotation during use such that the profile or size of the drive systems described herein may be reduced as compared to other drive systems.

In a first aspect, one or more embodiments of a hinged window assembly as described herein may include: a movable sash in a window frame, wherein the movable sash is attached to the window frame such that the movable sash can be rotated to open and close the movable sash in the window frame; a linkage connected to the window frame and the movable sash; and a drive system. The drive system is operably connected to the linkage, wherein the drive system and the linkage are configured to rotate the movable sash in the window frame, wherein the drive system comprises: a linkage driver fixedly mounted on a drive shaft, wherein the drive shaft defines a shaft axis extending along a length of the drive shaft, wherein rotating the drive shaft about the shaft axis rotates the linkage driver about the shaft axis, and wherein rotation of the linkage driver operates the linkage such that the movable sash rotates; a motor apparatus comprising an output shaft; a motor coupling apparatus operably connected to the drive shaft and the output shaft, wherein the motor coupling apparatus is configured to selectively couple or decouple the output shaft and the drive shaft; a hand crank coupling apparatus operably connected to a hand crank gear, wherein rotation of the hand crank gear about the drive shaft axis rotates the drive shaft when the hand crank coupling apparatus is in a manual configuration in which the hand crank gear is operably connected to the drive shaft; and a hand crank apparatus configured to rotate about a crank axis, and wherein rotation of the hand crank apparatus about the crank axis rotates hand crank gear about the shaft axis when the hand crank apparatus engages the hand crank gear.

In one or more embodiments of a hinged window assembly according to the first aspect, the hand crank coupling apparatus comprises motorized configuration in which the hand crank gear is disconnected from the drive shaft such that rotation of the hand crank gear about the shaft axis does not rotate the drive shaft about the shaft axis. In one or more embodiments, the hand crank coupling apparatus comprises a selector mechanism configured to move the hand crank gear in translation along the shaft axis when moving the hand crank coupling apparatus between the motorized configuration and the manual configuration. In one or more embodiments, the motor coupling apparatus comprises a drive shaft component fixedly connected to the drive shaft and an output shaft component fixedly connected to the output shaft of the motor apparatus, wherein the selector mechanism is configured to move the drive shaft component in translation along the shaft axis when moving the hand crank coupling apparatus between the motorized configuration and the manual configuration, wherein the drive shaft component engages the output shaft component when the hand crank coupling apparatus is in the motorized configuration.

In one or more embodiments of a hinged window assembly according to the first aspect, the hand crank gear comprises a bevel gear and wherein the hand crank apparatus comprises a driven bevel gear operably connected to a hand crank lever.

In one or more embodiments of a hinged window assembly according to the first aspect, the linkage driver comprises a worm gear.

In one or more embodiments of a hinged window assembly according to the first aspect, the linkage driver comprises a lead screw.

In a second aspect, one or more embodiments of a hinged window assembly as described herein may include: a movable sash in a window frame, wherein the movable sash is attached to the window frame such that the movable sash can be rotated to open and close the movable sash in the window frame; a linkage connected to the window frame and the movable sash; and a drive system operably connected to the linkage, the drive system and the linkage configured to rotate the movable sash in the window frame. The drive system comprises: a linkage driver fixedly mounted on a drive shaft, wherein the drive shaft defines a shaft axis extending along a length of the drive shaft, wherein rotating the drive shaft about the shaft axis rotates the linkage driver about the shaft axis, and wherein rotation of the linkage driver operates the linkage such that the movable sash rotates; a motor apparatus comprising an output shaft; a motor coupling apparatus operably connected to the drive shaft and the output shaft, wherein the motor coupling apparatus is configured to selectively couple or decouple the output shaft and the drive shaft; a hand crank gear fixedly attached to the drive shaft, wherein rotation of the hand crank gear about the drive shaft axis rotates the drive shaft; and a hand crank apparatus operably connected to a drive gear, wherein the hand crank apparatus is movable between a manual configuration and a motorized configuration, wherein the drive gear engages the hand crank gear when the hand crank apparatus is in the manual configuration, and wherein the drive gear does not engage the hand crank gear when the hand crank apparatus is in the motorized configuration, and further wherein rotation of a hand crank about a hand crank axis rotates the drive gear, the hand crank gear, the drive shaft, and the linkage driver when the hand crank apparatus is in the manual configuration.

In one or more embodiments of a hinged window assembly according to the second aspect, the drive system further comprises an interlock switch operably connected to the motor coupling apparatus, wherein the interlock switch couples the output shaft of the motor apparatus and the drive shaft only when the hand crank apparatus is in the motorized configuration.

In one or more embodiments of a hinged window assembly according to the second aspect, movement of the hand crank apparatus from the manual configuration to the motorized configuration moves the drive gear away from the hand crank gear.

In one or more embodiments of a hinged window assembly according to the second aspect, movement of the hand crank apparatus from the manual configuration to the motorized configuration moves the drive gear out of engagement with the hand crank gear along the hand crank axis. In one or more embodiments, movement of the hand crank apparatus from the manual configuration to the motorized configuration comprises rotating of the hand crank about a configuration axis, wherein the configuration axis is generally transverse to the hand crank axis.

In one or more embodiments of a hinged window assembly according to the second aspect, the linkage driver comprises a worm gear.

In one or more embodiments of a hinged window assembly according to the second aspect, the linkage driver comprises a lead screw.

In a third aspect, one or more embodiments of a hinged window assembly as described herein may include: a movable sash in a window frame, wherein the movable sash is attached to the window frame such that the movable sash can be rotated to open and close the movable sash in the window frame; a linkage connected to the window frame and the movable sash; and a drive system operably connected to the linkage, wherein the drive system and the linkage are configured to rotate the movable sash in the window frame. The drive system comprises: a linkage driver fixedly mounted on a drive shaft, wherein the drive shaft defines a shaft axis extending along a length of the drive shaft, wherein rotating the drive shaft about the shaft axis rotates the linkage driver about the shaft axis, and wherein rotation of the linkage driver operates the linkage such that the movable sash rotates; a motor apparatus comprising an output shaft; a motor coupling apparatus operably connected to the drive shaft and the output shaft, wherein the motor coupling apparatus is configured to selectively couple or decouple the output shaft and the drive shaft; a hand crank gear fixedly attached to the drive shaft, wherein rotation of the hand crank gear about the drive shaft axis rotates the drive shaft; a drive gear engaging the hand crank gear, wherein rotation of the hand crank gear about the shaft axis rotates the drive gear; and a hand crank apparatus comprising a hand crank shaft operably connected to the drive gear through a hand crank coupling, wherein the hand crank coupling is configured to selectively couple or decouple the hand crank shaft and the drive gear, wherein rotation of the hand crank shaft when the hand crank coupling couples the hand crank shaft and the drive gear rotates the drive gear, the hand crank gear, the drive shaft, and the linkage driver.

In one or more embodiments of a hinged window assembly according to the third aspect, wherein the drive system further comprises an interlock switch operably connected to the motor coupling apparatus, wherein the motor coupling apparatus couples the output shaft of the motor apparatus and the drive shaft only when the hand crank apparatus is in the motorized configuration as detected by the interlock switch. In one or more embodiments, the interlock switch is operably connected to the hand crank coupling apparatus, wherein the hand crank coupling apparatus couples the hand crank shaft and the drive gear only when the hand crank apparatus is in the manual configuration as detected by the interlock switch. In one or more embodiments, movement of the hand crank apparatus from the manual configuration to the motorized configuration comprises rotating a hand crank about a configuration axis, wherein the configuration axis is generally transverse to a hand crank axis about which the hand crank shaft and the drive gear rotate.

In one or more embodiments of a hinged window assembly according to the third aspect, the linkage driver comprises a worm gear.

In one or more embodiments of a hinged window assembly according to the third aspect, the linkage driver comprises a lead screw.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

It is noted that the term "comprises" and variations thereof do not have a limiting meaning where these terms appear in the accompanying description. Moreover, "a," "an," "the," "at least one," and "one or more" are used interchangeably herein.

The above summary is not intended to describe each embodiment or every implementation of the hinged window assemblies and drive systems described herein.

Rather, a more complete understanding of the invention will become apparent and appreciated by reference to the following Description of Illustrative Embodiments and claims in view of the accompanying figures of the drawing.

DESCRIPTION OF ILLUSTRATIVE EMBODIMENTS

Figure 1:
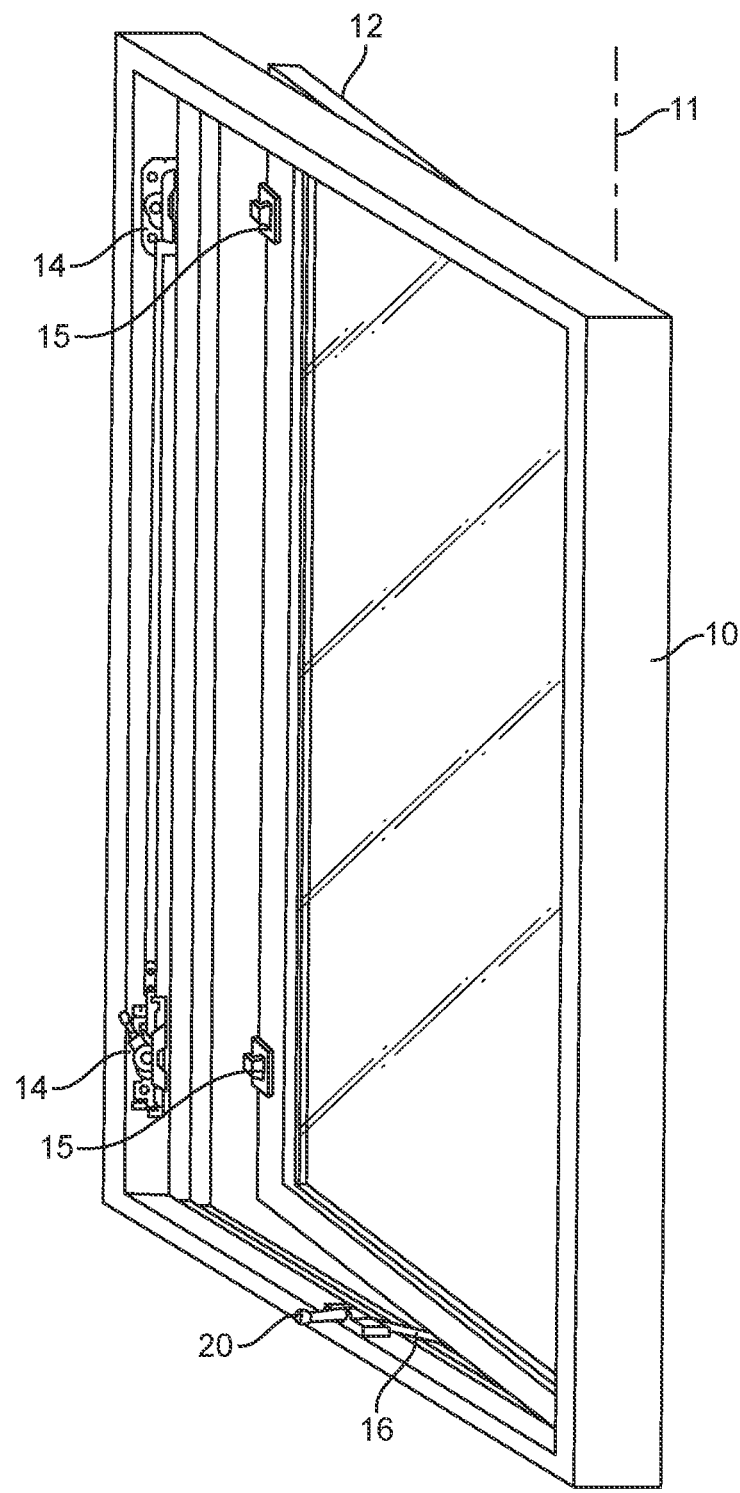
FIG. 1 is a perspective view of one illustrative embodiment of a hinged window assembly incorporating one illustrative embodiment of a hinged window drive system as described herein.

In the following description of illustrative embodiments, reference is made to the accompanying figures of the drawing which form a part hereof, and in which are shown, by way of illustration, specific embodiments. It is to be understood that other embodiments may be utilized and structural changes may be made without departing from the scope of the present invention.

The drive systems described herein may be used with a variety of different window assemblies where the window assemblies include a movable sash in a window frame, with the movable sash attached to the window frame such that the movable sash is rotated to open or close the window. Some examples of hinged window assemblies with which the hinged window drive systems described herein may be used include casement windows, awning windows, French casement windows, hopper windows, tilt-turn windows, pivot windows, utility windows, skylights, roof windows, etc.

One illustrative embodiment of a hinged window assembly is depicted in FIG. 1 and includes a movable sash 12 and a window frame 10, with the movable sash 12 being mounted for rotation about an axis, e.g., axis 11 to open and close the window. The hinged window assembly may include one or more lock mechanisms 14 mounted on the frame 10, with keepers 15 mounted on the movable sash 12. The lock mechanisms 14 and keepers 15 may be used to retain the movable sash 12 in a closed position. The depicted window assembly also includes a drive system 20 connected to a linkage 16, with the drive system 20 and linkage 16 cooperating to rotate the movable sash 12 about axis 11 to open and close the window. In one or more embodiments, the axis 11 (and the movable sash 12) may move laterally as the movable sash 12 rotates about the axis 11 depending on the linkages used to connect the movable sash 12 to the frame 10 (as is known in, e.g., conventional casement windows, etc.).

The drive systems described herein may, in one or more embodiments, include a driveshaft used to operate a linkage connected to the movable sash, where the linkage is used to open and close the movable sash in the window assembly. Rotation of the driveshaft may be achieved manually or with the use of a motor (e.g., an electric motor) with various mechanisms and structures provided to select between manual rotation of the driveshaft and motorized rotation of the driveshaft. In one or more embodiments where motorized operation is selected, a hand crank or other manual operation structure used to manually rotate the driveshaft may be disengaged or folded into a closed position.

Figure 2:
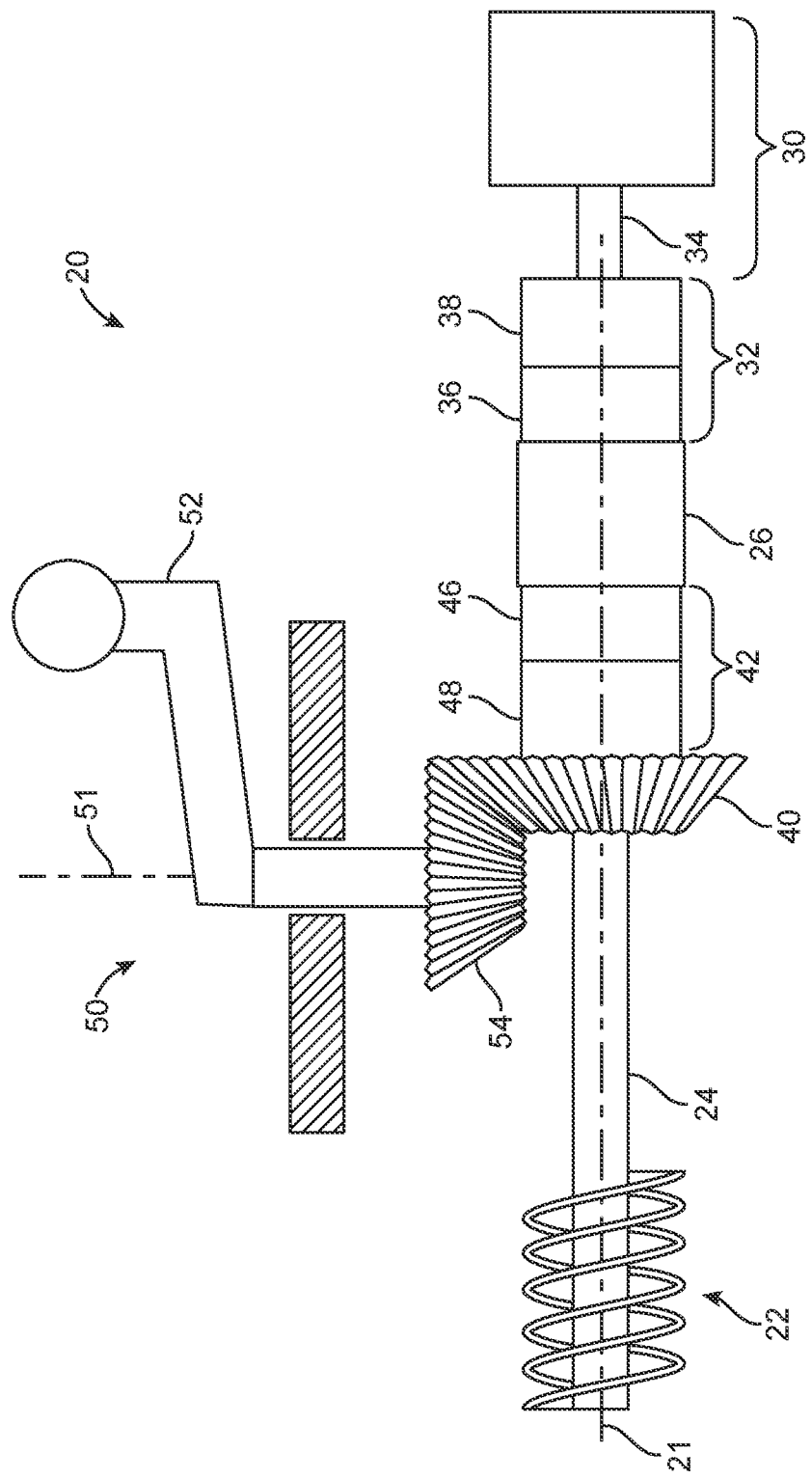
FIG. 2 is a schematic diagram of a portion of one illustrative embodiment of a drive system as described herein.

One illustrative embodiment of a portion of a drive system that may be used in a hinged window assembly as described herein is depicted in FIG. 2. The drive system 20 depicted in FIG. 2 may be operably connected to a linkage (see, e.g., linkage 16 in FIG. 1), with the drive system 20 and linkage configured to rotate a movable sash as described herein. In the depicted illustrative embodiment of FIG. 2, the drive system 20 includes a linkage driver 22 fixedly mounted on a driveshaft 24. The driveshaft 24 defines a shaft axis 21 that extends along a length of the driveshaft 24. Rotation of the driveshaft 24 about the shaft axis 21 may, in one or more embodiments, rotate the linkage driver 22 about the shaft axis 21. Further, rotation of the linkage driver 22 operates a linkage attached to a movable sash (see, e.g., the linkage 16 of FIG. 1) such that a movable sash attached to the linkage moves between an open and closed position.

The linkage drivers used in hinged window drive systems as described herein may be in a variety of forms such as, e.g., worm gears, lead screws, etc. Examples of some linkage drivers and/or linkages that may be used to rotate a movable sash within a window may be found in, e.g., U.S. Pat. Nos. 4,497,135 (Vetter); U.S Pat. No. 4,617,758 (Vetter); U.S Pat. No. 5,493,813 (Vetter et al.); U.S Pat. No. 5,813,171 (Piltingsrud); U.S Pat. No. 6,128,858 (Vetter et al.); etc.

The illustrative embodiment of drive system 20 depicted in FIG. 2 includes a motor apparatus 30 (including, e.g., an electric motor) having an output shaft 34 driven by the motor apparatus 30. The motor apparatus 30 may, in one or more embodiments, include gearing or other power transmission components used to transmit power from one or more motors in the motor apparatus 30 to the output shaft 34. In the depicted illustrative embodiment, the output shaft 34 is aligned with the driveshaft 24 and rotates about the shaft axis 21. It will, however, be understood that in one or more alternative embodiments, the output shaft 34 of the motor apparatus 30 may or may not be aligned with the driveshaft 24 and may rotate about an axis that is not collinear with the shaft axis 21.

Another component of the illustrative embodiment of drive system 20 depicted in FIG. 2 is a motor coupling apparatus 32 that is operably connected to the driveshaft 24 and the output shaft 34 of the motor apparatus 30. In the depicted illustrative embodiment, the motor coupling apparatus 32 includes an output shaft component 38 that is fixedly connected to the output shaft 34 of the motor apparatus 30 such that rotation of the output shaft 34 rotates the output shaft component 38 about the shaft axis 21 in the depicted illustrative embodiment.

The depicted illustrative embodiment of motor coupling apparatus 32 also includes a selective motor coupling 36 which may be used to selectively engage the output shaft component 38 with the driveshaft 24. In the depicted illustrative embodiment, a drive shaft component 26 is fixedly coupled to the driveshaft 24 such that rotation of the drive shaft component 26 is transmitted to the driveshaft 24. In other words, the motor coupling apparatus 32 can be used to selectively couple or decouple the output shaft 34 and the drive shaft 24 using the selective motor coupling 36 to connect or disconnect the drive shaft component 26 and the output shaft component 38. The selective motor coupling 36 may be provided in a variety of different forms including mechanical and/or electrical elements. For example, in one or more embodiments the selective motor coupling 36 may be in the form of a magnetic clutch, electric clutch, mechanical clutch, fluid clutch, pinned joint, other type of mechanical release, etc.

The illustrative embodiment of drive system 20 depicted in FIG. 2 also includes a hand crank coupling apparatus 42 operably connected to a hand crank gear 40. Rotation of the hand crank gear 40 about the drive shaft axis 21 rotates the driveshaft 24 when the hand crank coupling apparatus 42 is in a manual configuration in which the hand crank gear 40 is operably connected to the drive shaft 24. Connection of the hand crank gear 40 to the driveshaft 24 is achieved in the illustrative embodiment using a hand crank gear component 48 and a selective crank coupling 46.

The selective crank coupling 46 may be used to selectively engage the hand crank gear component 48 with the drive shaft component 26. In other words, the hand crank coupling apparatus 42 can be used to selectively couple or decouple the hand crank gear 40 and the drive shaft 24 using the selective crank coupling 46 to connect or disconnect the drive shaft component 26 and the hand crank gear component 48. The selective crank coupling 46 may be provided in a variety of different forms including mechanical and/or electrical elements. For example, in one or more embodiments the selective crank coupling 46 may be in the form of a magnetic clutch, mechanical release, spring pin, electric clutch, etc.

In the illustrative embodiment of drive system 20 depicted in FIG. 2, the hand crank coupling apparatus 42 may, in one or more embodiments, have a motorized configuration in which the hand crank gear 40 is disconnected from the driveshaft 24 such that rotation of the hand crank gear 40 about the shaft axis 21 does not rotate the driveshaft 24 about the shaft axis 21. In other words, the hand crank coupling apparatus 42, when in the motorized configuration, allows for rotation of the hand crank gear 40 relative to the driveshaft 24 such that the motor apparatus 30 can be used to rotate the driveshaft 24 about the shaft axis 21 to rotate the linkage driver 22 without rotating the hand crank gear 40, thereby operating a linkage to move a movable sash in a window as described herein.

The illustrative embodiment of drive system 20 depicted in FIG. 2 also includes a hand crank apparatus 50 configured to rotate about a crank axis 51 when the hand crank apparatus 42 is in a manual configuration for manual operation of the drive system 20 to open and close a movable sash connected to the drive system through a linkage as described herein.

In one or more embodiments, rotation of the hand crank apparatus 50 about the crank axis 51 rotates the hand crank gear 40 about the shaft axis 21 when the hand crank apparatus 50 engages the hand crank gear 40 and the hand crank coupling apparatus 42 is in a manual configuration. In the depicted illustrative embodiment, the hand crank apparatus 50 engages the hand crank gear 40 using a driven gear 54 which, in the depicted illustrative embodiment, rotates about crank axis 51. Although the hand crank gear 40 and driven gear 54 in the depicted illustrative embodiment of drive system 20 are in the form of bevel gears, it should be understood that in one or more alternative embodiments other power transmission components may be used to manually rotate the driveshaft of a drive system as described herein, such as, e.g., ring gears, worm gears, rack and pinion, etc.

Figure 3:
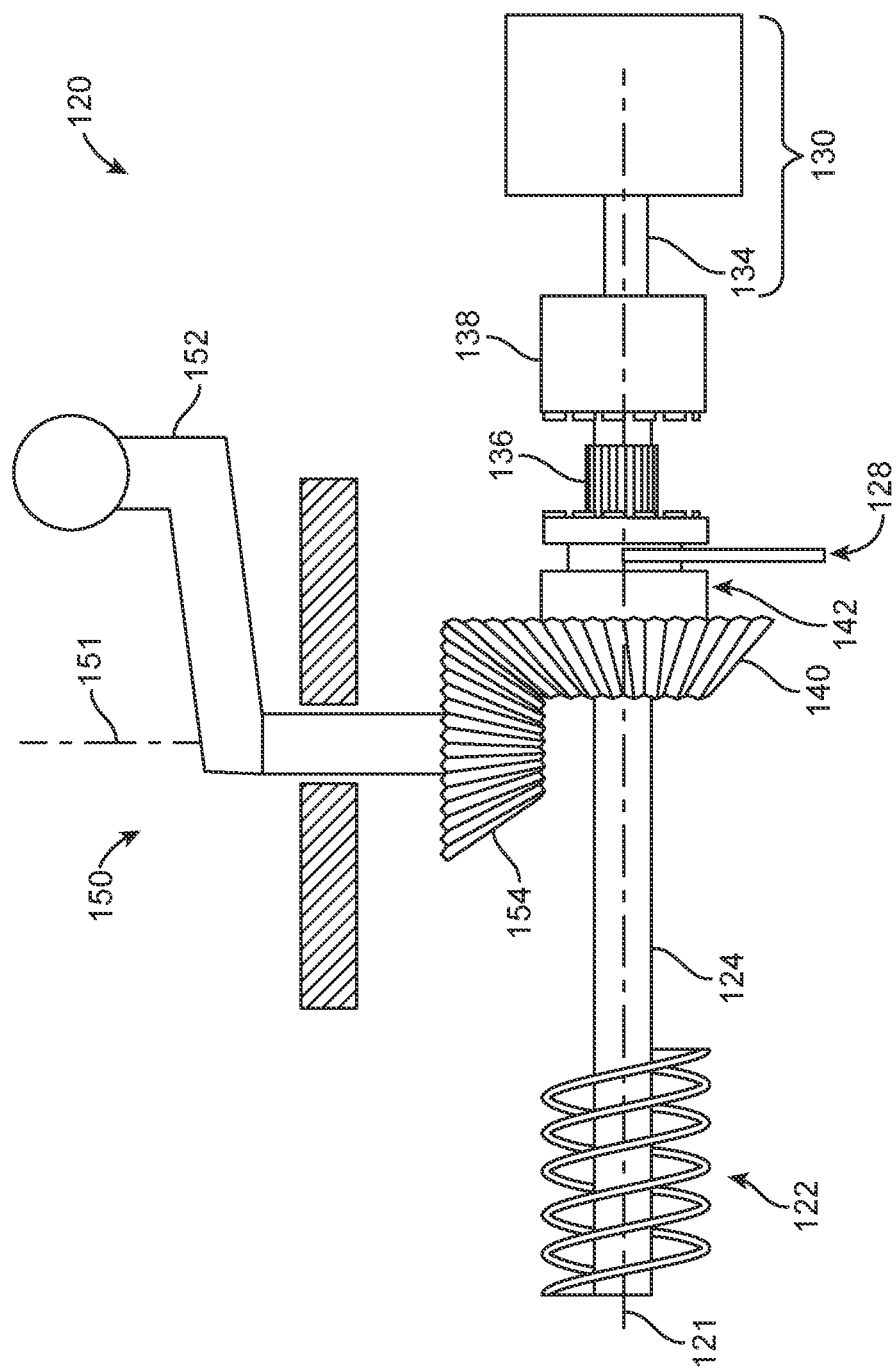
FIG. 3 is a schematic diagram of a portion of another illustrative embodiment of a drive system as described herein, wherein the hinged window drive system is in a manual configuration.
Figure 4:
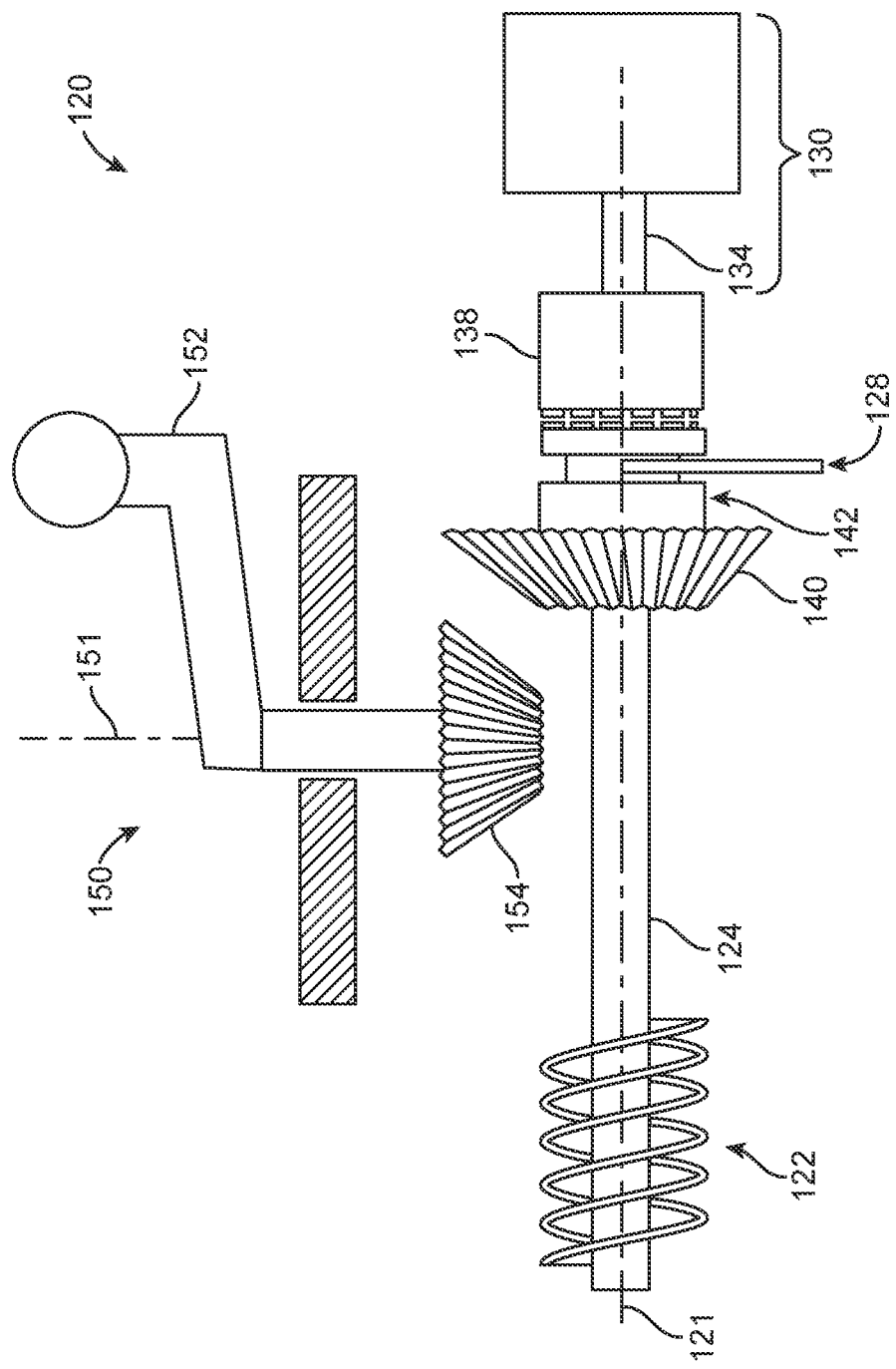
FIG. 4 is a schematic diagram of the drive system of FIG. 3, with the drive system in a motorized configuration.

A portion of one alternative illustrative embodiment of a drive system 120 that may be used with a linkage to move a movable sash in a window is depicted in FIGS. 3 and 4. The illustrative embodiment of drive system 120 includes a number of components in common with the drive system 20 depicted in FIG. 1. For example, the drive system 120 includes a linkage driver 122 mounted on a drive shaft 124 for rotation about a shaft axis 121. The drive system 120 also includes a motor apparatus 130 having an output shaft 134 along with an output shaft component 138 that is fixedly connected to the output shaft 134 of the motor apparatus 130 such that rotation of the output shaft 134 results in rotation of the output shaft component 138.

The illustrative embodiment of drive system 120 also includes a hand crank apparatus 150 (having, e.g., a hand crank 152) configured to rotate about a crank axis 151. Rotation of the hand crank apparatus 150 about the crank axis 151 rotates a drive gear 154 about the crank axis 151. When the drive gear 154 rotates about the crank axis 151 and is engaged with the hand crank gear 140 (as seen in, e.g., FIG. 3), rotation of the drive shaft 124 and linkage driver 122 about the shaft axis 121 can be obtained.

The illustrative embodiment of drive system 120 includes a hand crank coupling apparatus 142 that is in the manual configuration in FIG. 3 in which the hand crank gear 140 is positioned such that it engages with a drive gear 154 of the hand crank apparatus 150. In that manual configuration, the drive shaft component 136 does not engage the output shaft component 138. Furthermore, engagement between the drive gear 154 and the hand crank gear 140 allows the hand crank apparatus 150 including crank 152 to rotate to the drive gear 154 such that hand crank gear 140 rotates about the shaft axis 121. As discussed herein, rotation of the hand crank gear 140 when the hand crank coupling apparatus 142 is in the manual configuration as depicted in FIG. 3 causes corresponding rotation of the driveshaft 124 about the shaft axis 121 and, therefore, corresponding rotation of the linkage driver 122 about the shaft axis 121.

The selector mechanism 128 functions to move the hand crank gear 140 in translation along the drive shaft 124 and the shaft axis 121 to move the hand crank coupling apparatus 142 between a manual configuration (seen in, e.g., FIG. 3) and a motorized configuration (seen in, e.g., FIG. 4). In the motorized configuration, the hand crank gear 140 is positioned such that it is not engaging the drive gear 154 of the hand crank apparatus 150. As a result, the hand crank apparatus 150 cannot be used to rotate to the hand crank gear 140 or the attached driveshaft 124 when the hand crank coupling apparatus 142 is in the motorized configuration as depicted in FIG. 4.

The illustrative embodiment of drive system 120 also includes a drive shaft component 136 that is fixedly connected to the drive shaft 124 such that rotation of the drive shaft component 136 about the shaft axis 121 causes the drive shaft 124 to also rotate about the shaft axis 121. In the illustrative embodiment of drive system 120, the drive shaft component 136 and the output shaft component 138 provide a motor coupling apparatus, while a selector mechanism 128 moves the motor coupling apparatus between a motorized configuration and a manual configuration (along with the hand crank coupling apparatus 142 as discussed above). In other words, in the illustrative embodiment of drive system 120 depicted in FIGS. 3 and 4, the selector mechanism 128 forms a part of both the hand crank coupling apparatus 142 and the motor coupling apparatus.

The selector mechanism 128 is, in the depicted illustrative embodiment, configured to selectively move the drive shaft component 136 in translation along the drive shaft 124 and the shaft axis 121 such that the drive shaft component 136 engages the output shaft component 138. In particular, the drive shaft component 136 is shown in FIG. 3 (which may be in the form of an externally splined member) in a position in which it is not engaged with the output shaft component 138 (which may include an internal splined cavity configured to receive the externally splined drive shaft component 136). Although the drive shaft component 136 is, in the depicted illustrative embodiment, engaged with the output shaft component 138 in a manner in which the drive shaft component 136 is contained within the output shaft component 138 such that it is not visible in FIG. 4, such an arrangement is not required.

Figure 5:
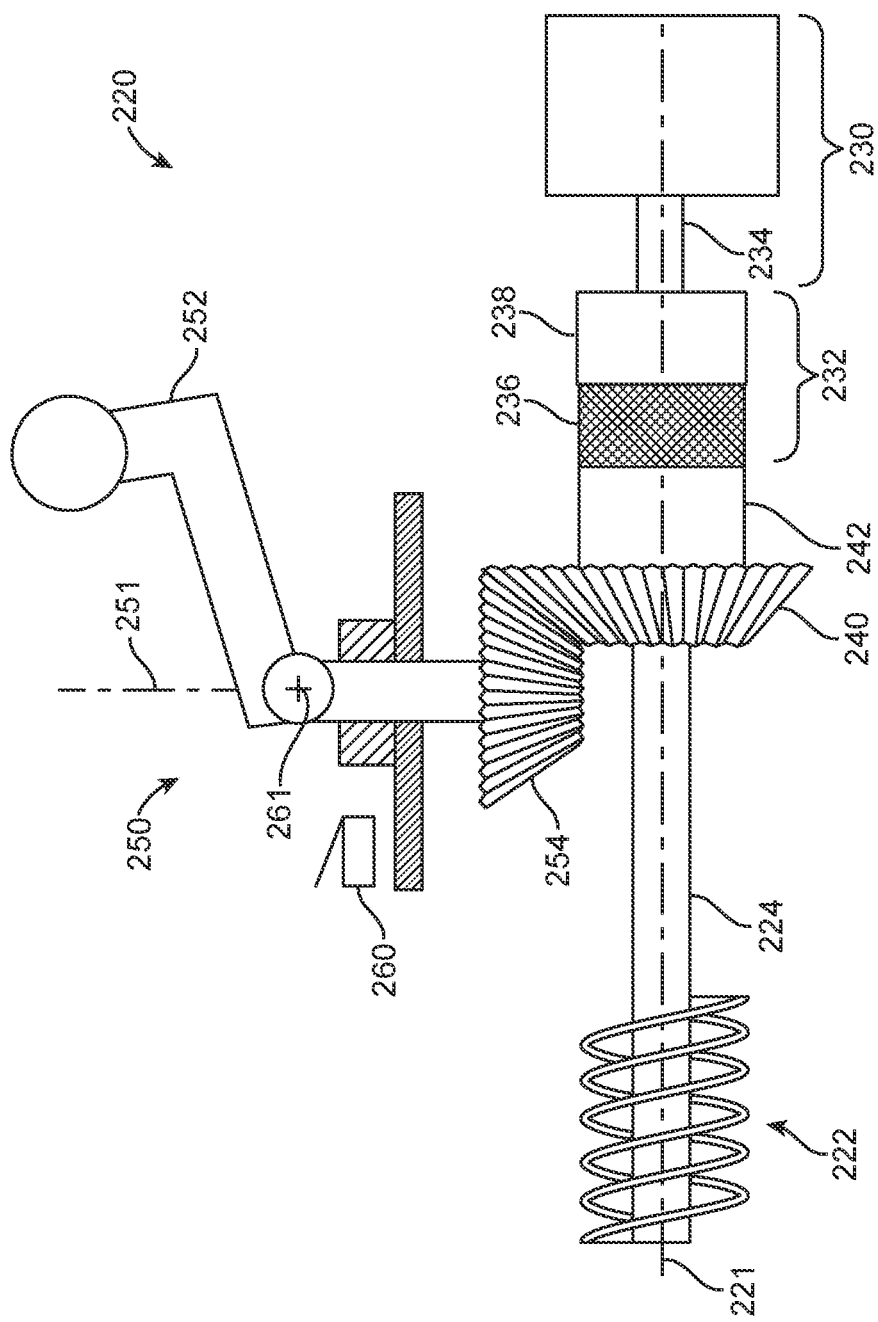
FIG. 5 is a schematic diagram of a portion of another illustrative embodiment of a drive system as described herein, wherein the drive system is in a manual configuration.
Figure 6:
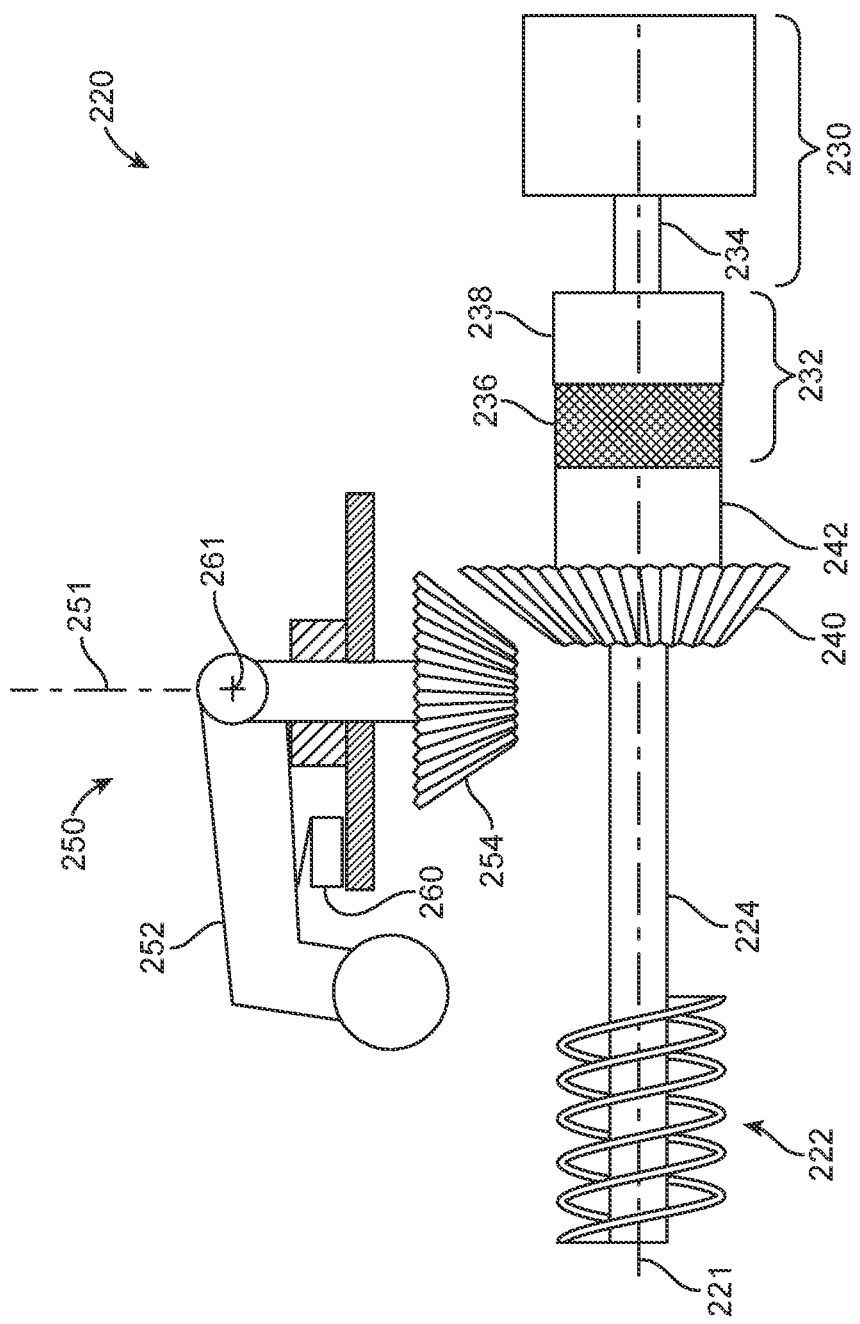
FIG. 6 is a schematic diagram of the drive system of FIG. 5, with the drive system in a motorized configuration.

A portion of another illustrative embodiment of a drive system 220 that may be used to rotate a movable sash within a window frame is depicted in FIGS. 5 and 6. In particular, the drive system 220 is depicted in a manual configuration in FIG. 5 and a motorized configuration in FIG. 6. The drive system 220 includes a driveshaft 224 and linkage driver 222 fixedly mounted on the drive shaft 224, with both components rotating about the shaft axis 221.

Also included in drive system 220 is a motor apparatus 230 having an output shaft 234. In the depicted embodiment, the output shaft 234 is aligned with the drive shaft 224 and also rotates about the shaft axis 221, although as described herein, such an arrangement between the output shaft 234 and the drive shaft 224 is not required in drive systems as described herein.

The illustrative embodiment of drive system 220 also includes a motor coupling apparatus 232 operably connected to the drive shaft 224 and the output shaft 234. The motor coupling apparatus 232 is configured to selectively couple or decouple the output shaft 234 and the drive shaft 224 (where the drive shaft 224 rotates or can be driven by the output shaft 234 when the output shaft 234 and the drive shaft 224 are coupled by the motor coupling apparatus 232).

In the depicted illustrative embodiment, the motor coupling apparatus 232 includes an output shaft component 238 fixedly attached to the output shaft 234 such that the output shaft component 238 rotates or is driven by the output shaft 234 of the motor apparatus 230. Motor coupling apparatus 232 also includes a selective motor coupling 236 which may be used to selectively engage the output shaft component 238 with the drive shaft 224. In particular, the selective motor coupling 236 is fixedly attached to the drive shaft 224 and can be selectively coupled to the output shaft component 238 or vice versa. When the selective motor coupling 236 couples the drive shaft 224 and the output shaft component 238, the motor apparatus 230 can be used to rotate the driveshaft 224 about shaft axis 221. When the selective motor coupling 236 couples the drive shaft 224 and the output shaft component 238, the motor apparatus 230 cannot be used to rotate the driveshaft 224 about shaft axis 221. For example, in one or more embodiments the selective motor coupling 236 may be in the form of a magnetic clutch, electric clutch, mechanical clutch, fluid clutch, pinned joint, other type of mechanical release, etc.

The illustrative drive system 220 depicted in FIGS. 5 and 6 also includes a hand crank gear 240 fixedly attached to the drive shaft 224 such that rotation of the hand crank gear 240 about the drive shaft axis rotates the drive shaft 224.

In addition, the drive system 220 also includes a hand crank apparatus 250 operably connected to a drive gear 254. The hand crank apparatus 250 is movable between a manual configuration (see, e.g., FIG. 5) and a motorized configuration (see, e.g., FIG. 6). In the manual configuration, the drive gear 254 engages the hand crank gear 240. When the hand crank apparatus 250 is in the manual configuration, rotation of a hand crank 252 of the hand crank apparatus 250 about a hand crank axis 251 rotates the drive gear 254, the hand crank gear 240, the drive shaft 224, and the linkage driver 222.

When the hand crank apparatus 250 is in the motorized configuration of the illustrative embodiment of drive system 220, the drive gear 254 does not engage the hand crank gear 240. As a result, the hand crank apparatus 250 cannot rotate the hand crank gear 240 when the hand crank apparatus 250 is in the motorized configuration In the illustrative embodiment of drive system 220, movement of the hand crank apparatus 250 from the manual configuration as seen in FIG. 5 to the motorized configuration as seen in FIG. 6 moves the drive gear 254 out of engagement with the hand crank gear 240. In one or more embodiments, movement of the hand crank apparatus 250 from the manual configuration to the motorized configuration moves the drive gear 254 away from the hand crank gear 240 along a hand crank axis 251 about which the drive gear 254 rotates when operated using the hand crank apparatus 250. In one or more embodiments, movement of the hand crank apparatus 250 from the manual configuration to the motorized configuration includes rotating the hand crank 252 about a configuration axis 261 which, in the views seen in FIGS. 5 and 6, extends into the sheet on which FIGS. 5 and 6 are provided. In one or more embodiments, the configuration axis 261 may be generally transverse to the hand crank axis 251, although such an arrangement is not required. Movement of the drive gear 254 out of engagement with the hand crank gear 240 through rotation of the hand crank 252 about configuration axis 261 may be achieved using, e.g., a cam or any other suitable mechanical apparatus that causes drive gear 254 to move out of engagement with hand crank gear 240 such as, e.g., electrical engagement, lever action, etc.

The depicted illustrative embodiment of drive system 220 also includes an interlock switch 260 operably connected to the selective motor coupling 236 of the motor coupling apparatus 232, with the interlock switch 260 causing or allowing the output shaft 234 of the motor apparatus 230 to couple with the drive shaft 224 through the selective motor coupling 236 and the output shaft component 238 only when the hand crank apparatus 250 is in the manual configuration such that the interlock switch 260 is tripped or triggered to indicate that the hand crank apparatus 250 is in the manual configuration. In one or more embodiments, the interlock switch 260 may be in the form of e.g. a mechanical switch (e.g., a plunger activated switch, etc.), a proximity switch (e.g., a Hall effect sensor, magnetoresistive, inductive, capacitive, photoelectric, ultrasonic, magnetic reed switch, etc.).

In particular, in the depicted embodiment the position of hand crank 252 relative to the interlock switch 260 is used to trip or trigger the interlock switch 260 and provide an indication to the selective motor coupling 236 that the hand crank apparatus 250 is in the motorized configuration such that coupling between the motor apparatus 230 and the drive shaft 224 can be effected. If the hand crank 252 of the hand crank apparatus 250 is not in a position to trip or trigger the interlock switch 260, then selective motor coupling 236 cannot couple the output shaft component 238 with the drive shaft 224 as described herein.

Figure 7:
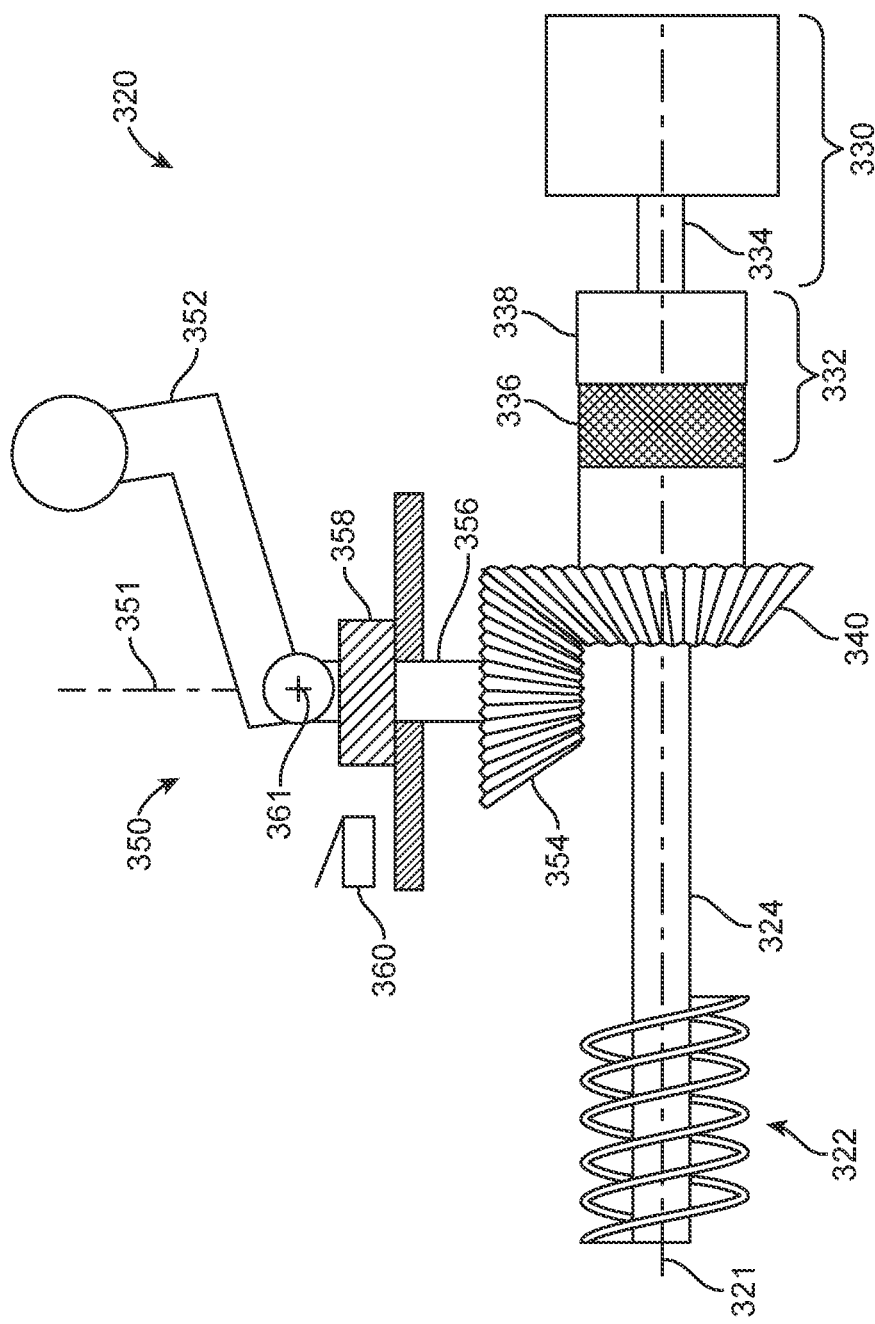
FIG. 7 is a schematic diagram of a portion of another illustrative embodiment of a drive system according to the present invention, wherein the drive system is in a manual configuration.
Figure 8:
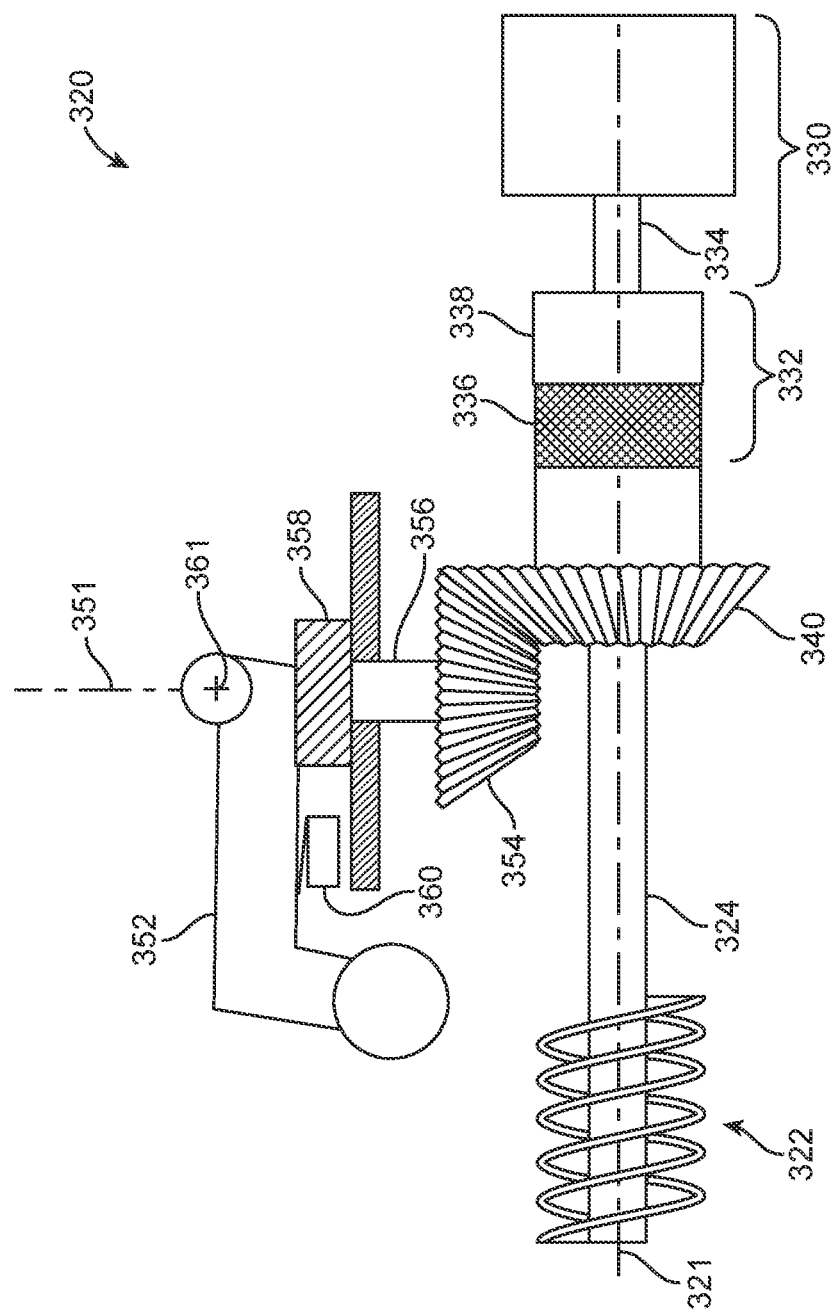
FIG. 8 is a schematic diagram of the drive system of FIG. 7, with the drive system in a motorized configuration.

A portion of still another alternative illustrative embodiment of a drive system 320 is depicted in FIGS. 7 and 8. The illustrative embodiment of drive system 320 includes a number of components in common with the other illustrative embodiments of drive systems described herein. For example, the drive system 320 includes a linkage driver 322 fixedly mounted on a drive shaft 324 for rotation about a shaft axis 321 and movement of a movable sash in a window as described herein.

The drive system 320 also includes a motor apparatus 330 having an output shaft 334 along with an output shaft component 338 that is fixedly connected to the output shaft 334 of the motor apparatus 330 such that rotation of the output shaft 334 results in rotation of the output shaft component 338. In the depicted embodiment, the output shaft 334 is aligned with the drive shaft 324 and also rotates about the shaft axis 321, although as described herein, such an arrangement between the output shaft 334 and the drive shaft 324 is not required in drive systems as described herein.

This illustrative embodiment of drive system 320 also includes a motor coupling apparatus 332 operably connected to the drive shaft 324 and the output shaft 334. The motor coupling apparatus 332 is configured to selectively couple or decouple the output shaft 334 and the drive shaft 324 (where the drive shaft 324 rotates or can be driven by the output shaft 334 when the output shaft 334 and the drive shaft 324 are coupled by the motor coupling apparatus 332). In the depicted illustrative embodiment, the motor coupling apparatus 332 includes the output shaft component 338 fixedly attached to the output shaft 334 such that the output shaft component 338 rotates or is driven by the output shaft 334 of the motor apparatus 330.

Motor coupling apparatus 332 also includes a selective motor coupling 336 which, in one embodiment, may be used to selectively engage the output shaft component 338 with the drive shaft 324. In particular, the selective motor coupling 336 is fixedly attached to the drive shaft 324 and can be selectively coupled to the output shaft component 338 or vice versa. When the selective motor coupling 336 couples the drive shaft 324 and the output shaft component 338, the motor apparatus 330 can be used to rotate the driveshaft 324 about shaft axis 321. When the selective motor coupling 336 does not couple the drive shaft 324 and the output shaft component 338, the motor apparatus 330 cannot be used to rotate the driveshaft 324 about shaft axis 321. For example, in one or more embodiments the selective motor coupling 336 may be in the form of a magnetic clutch electric clutch, mechanical clutch, fluid clutch, pinned joint, other type of mechanical release, etc.

The illustrative drive system 320 depicted in FIGS. 7 and 8 also includes a hand crank gear 340 fixedly attached to the drive shaft 324 such that rotation of the hand crank gear 340 about the drive shaft axis 321 rotates the drive shaft 324 and vice versa.

In addition, the drive system 320 also includes a hand crank apparatus 350 selectively coupled to a drive gear 354 through a hand crank shaft 356 and a hand crank coupling apparatus 358. In particular, the hand crank coupling apparatus 358 may be used to selectively couple or decouple the hand crank shaft 356 and the drive gear 354. When the hand crank coupling apparatus 358 couples the hand crank shaft 356 and the drive gear 354, rotation of the hand crank shaft 356 causes corresponding rotation of the drive gear 354 about the hand crank axis 351. In such a manual configuration in which the hand crank 352 of the hand crank apparatus 350 rotates about the hand crank axis 351 to rotate the drive gear 354, the drive gear 354 rotates the hand crank gear 340, the drive shaft 324, and the linkage driver 322 to manually open or close a movable sash in a window as described herein.

Conversely, when the hand crank coupling apparatus 358 does not couple the hand crank shaft 356 and the drive gear 354, rotation of the hand crank shaft 356 does not cause any corresponding rotation of the drive gear 354 about the hand crank axis 351. In that situation, the hand crank coupling apparatus 358 may be described as being in a motorized configuration. In such a configuration, the drive gear 354 may rotate independently of the hand crank shaft 356 because the hand crank shaft 356 and the drive gear 354 are not coupled with each other. In such a motorized configuration, the motor apparatus 330 may be coupled to the drive shaft as described herein and cause rotation of the hand crank gear 340, with corresponding rotation of the drive gear 354. Because, however, the drive gear 354 is not coupled to the hand crank shaft 356 rotation of the crank 352 of the hand crank apparatus 350 does not occur. For example, in one or more embodiments the hand crank coupling apparatus 358 may be in the form of a magnetic clutch, mechanical release, spring pin, electric clutch, etc.

In one or more embodiments of the illustrative embodiment of drive system 320, the drive system 320 may include an interlock switch 360 operably connected to the selective motor coupling 336 of the motor coupling apparatus 332, with the interlock switch 360 causing the output shaft 334 of the motor apparatus 330 to couple with the drive shaft 324 through the selective motor coupling 336 and the output shaft component 338 only when the hand crank apparatus 350 is in the manual configuration (see, e.g., FIG. 8) such that the interlock switch 360 is tripped or triggered to indicate that the hand crank apparatus 350 is in the manual configuration. In one or more embodiments, the interlock switch 360 may be in the form of e.g. a mechanical switch (e.g., a plunger activated switch, etc.), a proximity switch (e.g., a Hall effect sensor, magnetoresistive, inductive, capacitive, photoelectric, ultrasonic, magnetic reed switch, etc.).

In particular, the position of hand crank 352 of the hand crank apparatus 350 relative to the interlock switch 360 is used in the depicted illustrative embodiment to trip or trigger the interlock switch 360 and provide an indication to the selective motor coupling 336 that the hand crank apparatus 350 is in the motorized configuration such that coupling between the motor apparatus 330 and the drive shaft 324 can be effected. When the position of the hand crank 352 of the hand crank apparatus 350 is in the motorized configuration, the interlock switch 360 may also provide an indication to the hand crank coupling apparatus 358 such that the hand crank shaft 356 is not coupled to the drive gear 354 when the motor apparatus 330 is coupled to the drive shaft 324.

If the hand crank 352 of the hand crank apparatus 350 is not in a position to trip or trigger the interlock switch 360, i.e., is in a manual configuration as seen in, e.g., FIG. 7, then selective motor coupling 336 does not couple the output shaft component 338 with the drive shaft 324, but the hand crank coupling apparatus 358 does couple the hand crank shaft 356 with the drive gear 354 to allow for manual operation of a window using hand crank 352 of hand crank apparatus 350.

In one or more embodiments, movement of the hand crank apparatus 350 from the manual configuration (see, e.g., FIG. 7) to the motorized configuration (see, e.g., FIG. 8) includes rotating the hand crank 352 about a configuration axis 361 which, in the views seen in FIGS. 7 and 8, extends into the sheet on which FIGS. 7 and 8 are provided. In one or more embodiments, the configuration axis 361 may be generally transverse to the hand crank axis 351, although such an arrangement is not required.

Figure 9:
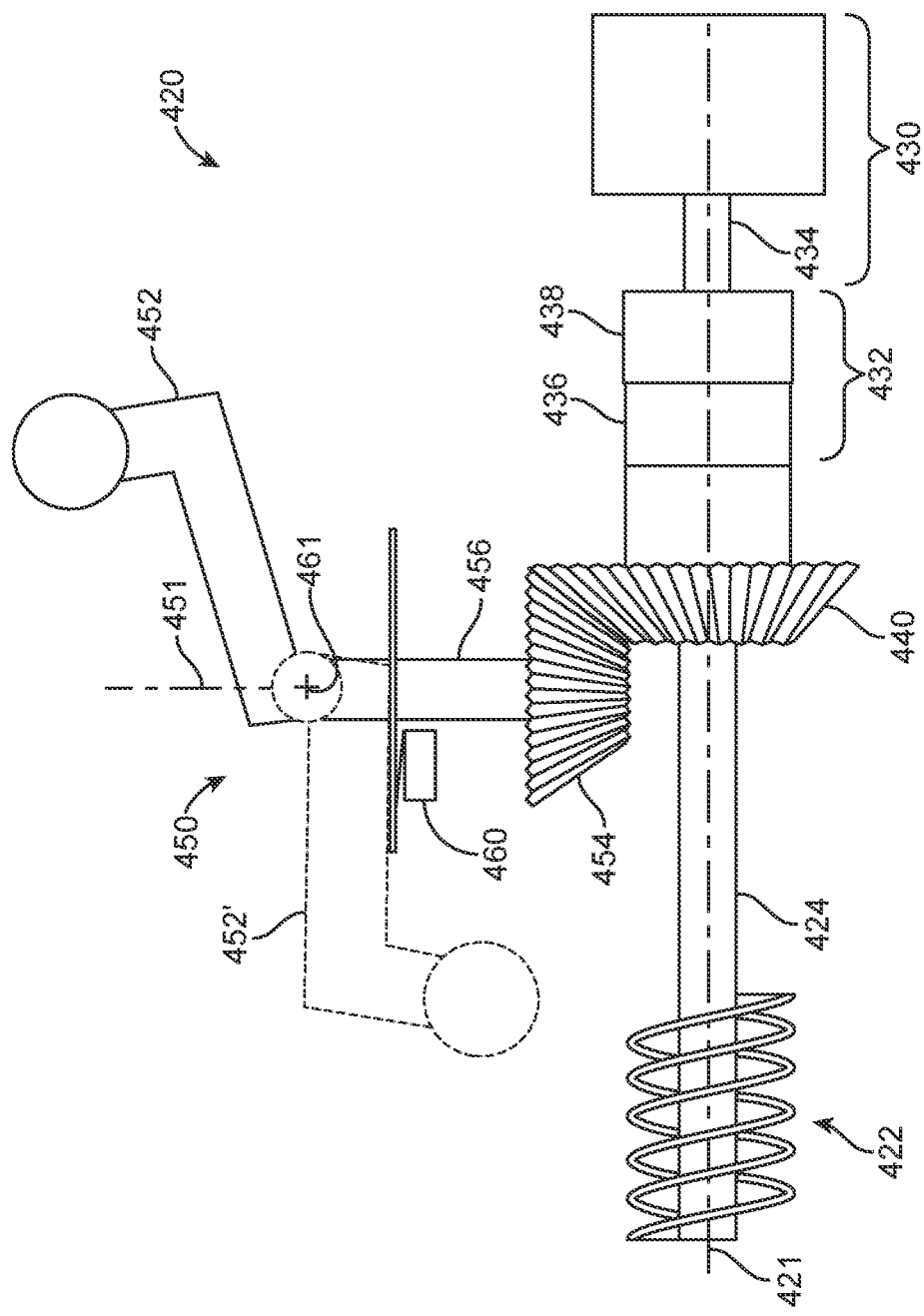
FIG. 9 is a schematic diagram of a portion of another illustrative embodiment of a drive system as described herein.

A portion of yet another alternative illustrative embodiment of a drive system 420 is depicted in FIG. 9. The illustrative embodiment of drive system 420 includes a number of components in common with the other illustrative embodiments of drive systems described above. For example, the drive system 420 includes a linkage driver 422 fixedly mounted on a drive shaft 424 for rotation about a shaft axis 421.

The drive system 420 also includes a motor apparatus 430 having an output shaft 434 along with an output shaft component 438 that is fixedly connected to the output shaft 434 of the motor apparatus 430 such that rotation of the output shaft 434 results in rotation of the output shaft component 438. In the depicted embodiment, the output shaft 434 is aligned with the drive shaft 424 and also rotates about the shaft axis 421, although as described herein, such an arrangement between the output shaft 434 and the drive shaft 424 is not required in drive systems as described herein.

This illustrative embodiment of drive system 420 also includes a motor coupling apparatus 432 configured to selectively couple or decouple the output shaft 434 and the drive shaft 424 (where the drive shaft 424 rotates or can be driven by the output shaft 434 when the output shaft 434 and the drive shaft 424 are coupled by the motor coupling apparatus 432). In the depicted illustrative embodiment, the motor coupling apparatus 432 includes an output shaft component 438 fixedly attached to the output shaft 434 such that the output shaft component 438 rotates or is driven by the output shaft 434 of the motor apparatus 430.

Motor coupling apparatus 432 also includes a selective motor coupling 436 which may be used to selectively engage the output shaft 434 with the drive shaft 424. In particular, the selective motor coupling 436 is fixedly attached to the drive shaft 424 and can be selectively coupled to the output shaft component 438 or vice versa. When the selective motor coupling 436 couples the drive shaft 424 and the output shaft component 438, the motor apparatus 430 can be used to rotate the driveshaft 424 about shaft axis 421. When the selective motor coupling 436 does not couple the drive shaft 424 and the output shaft component 438, the motor apparatus 430 cannot be used to rotate the driveshaft 424 about shaft axis 421. For example, in one or more embodiments the selective motor coupling 436 may be in the form of a magnetic clutch, electric clutch, mechanical clutch, fluid clutch, pinned joint, other type of mechanical release, etc.

The illustrative drive system 420 depicted in FIG. 9 also includes a hand crank gear 440 fixedly attached to the drive shaft 424 such that rotation of the hand crank gear 440 about the drive shaft axis 421 rotates the drive shaft 424 and vice versa.

In addition, the illustrative drive system 420 also includes a hand crank apparatus 450 coupled to drive gear 454 through a hand crank shaft 456. Rotation of the hand crank 452 of the hand crank apparatus 450 causes rotation of the hand crank shaft 456 and drive gear 454. Rotation of the drive gear 454 causes corresponding rotation of the hand crank gear 440, the drive shaft 424, and the linkage driver 422 to manually open or close a movable sash in a window as described herein.

The hand crank apparatus 450 is movable between a manual configuration and a motorized configuration. In the manual configuration, the hand crank 452 is deployed as seen in FIG. 9 and ready to be used to rotate hand crank shaft 456 and drive gear 454 to rotate hand crank gear 440, drive shaft 424, and linkage driver 422 for manual opening and closing of a movable sash of a window as described herein.

In the motorized configuration, the hand crank 452' (depicted in broken lines in FIG. 9) is positioned to trigger or trip an interlock switch 460. The interlock switch 460 is operably connected to the selective motor coupling 436 of the motor coupling apparatus 432, with the interlock switch 460 causing the output shaft 434 of the motor apparatus 430 to couple with the drive shaft 424 through the selective motor coupling 436 and the output shaft component 438 only when the hand crank apparatus 450 is in the manual configuration such that the interlock switch 460 is tripped or triggered to indicate that the hand crank apparatus 450 is in the manual configuration. In one or more embodiments, the interlock switch 460 may be in the form of e.g. a mechanical switch (e.g., a plunger activated switch, etc.), a proximity switch (e.g., a Hall effect sensor, magnetoresistive, inductive, capacitive, photoelectric, ultrasonic, magnetic reed switch, etc.). If the hand crank 452' of the hand crank apparatus 450 does not trip or trigger the interlock switch 460, then selective motor coupling 436 cannot couple the output shaft component 438 with the drive shaft 424 as described herein.

In one or more embodiments, movement of the hand crank apparatus 450 from the manual configuration to the motorized configuration includes rotating the hand crank 452 about a configuration axis 461 which, in FIG. 9, extends into the sheet on which FIG. 9 is provided. In one or more embodiments, the configuration axis 461 may be generally transverse to the hand crank axis 451, although such an arrangement is not required.

Although positioning of the hand crank 452' in the motorized configuration in which interlock switch 460 is tripped or triggered causes the selective motor coupling 436 to couple the output shaft 434 of the motor apparatus 430 with the drive shaft 424, it does not decouple the hand crank 452' from the hand crank shaft 456, drive gear 454 or hand crank gear 440. As a result, the hand crank 452' will rotate about the hand crank axis 451 when the motor apparatus 430 is actuated to rotate the driveshaft 424. In one or more embodiments, the hand crank 452' may be located within a housing such that interference with its rotation about the hand crank axis 451 while the motor apparatus 430 operates can be avoided.

Although depicted as aligned along the various drive shaft axes in the depicted illustrative embodiments, it should be understood that some components of the drive systems described herein may not necessarily be axially aligned along the drive shaft axis in all embodiments of the invention. For example, the motors, motor coupling apparatus, drive shaft components, hand crank coupling apparatus, etc. may or may not be arranged axially as depicted in the illustrative embodiments described herein.

One or more of the illustrative embodiments of the drive systems described herein may include selective couplings to selectively couple and decouple components in the drive systems. As described herein, the selective couplings may be operably connected to one or more other components in one or more of the drive systems, e.g., a motor apparatus, interlock switch, etc. Such operable connections may, in one or more embodiments, be made using one or more control units that may be integrated into the drive systems described herein.

Figure 10:
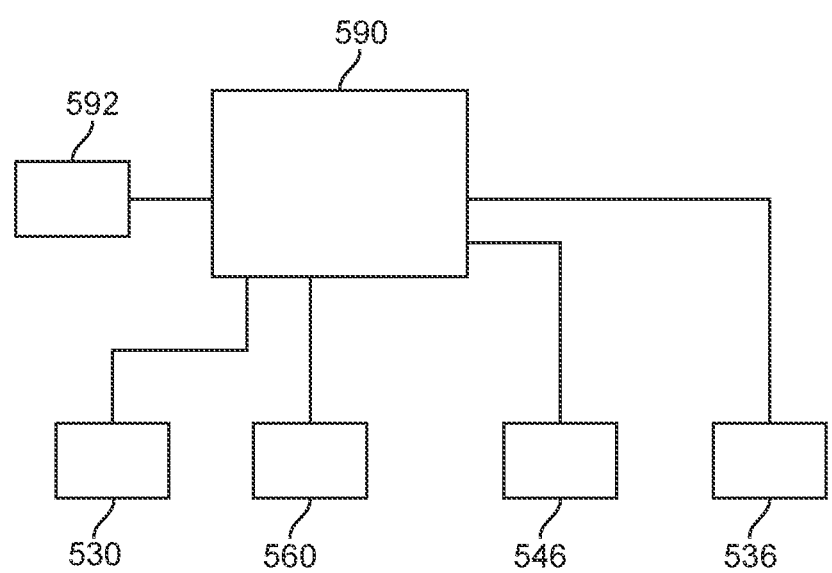
FIG. 10 is a block diagram of one illustrative embodiment of a control unit that may be used in one or more embodiments of a drive system as described herein.

One illustrative embodiment of a control unit 590 that may be used in one or more embodiments of a drive system as described herein is depicted in FIG. 10. The control unit 590 may be provided in any suitable form and may, for example, include a power supply (in the form of one or more of, e.g., AC line power, battery and/or solar, capacitive, etc.), memory and a controller. The controller may, for example, be in the form of one or more microprocessors, Field-Programmable Gate Arrays (FPGA), Digital Signal Processors (DSP), microcontrollers, Application Specific Integrated Circuit (ASIC) state machines, etc. The control units may include one or more of any suitable input devices configured to allow a user to operate the drive system (e.g., keyboards, touchscreens, mice, trackballs, buttons, etc.), as well as display devices configured to convey information to a user (e.g., LCD displays, monitors, indicator lights, audible devices (e.g., speakers, buzzers, sirens, etc.) etc.).

In the depicted embodiment, the control unit 590 is connected to various components that may be found in one or more of the drive systems described herein. As depicted in FIG. 10, the control unit 590 is operably connected to a motor apparatus 530, a selective motor coupling 536, selective crank coupling 546, and interlock switch 560. One or more of these components are described herein in connection with various illustrative embodiments of drive systems. Also depicted in FIG. 10 in connection with the illustrative control system is a transceiver unit 592 which may be used to transmit and/or receive control signals through one or more of mechanical, hydraulic, wired and/or wireless connections (including any suitable electromagnetic signal, light, etc.) . Such control signals may include signals used for operation of the drive systems and/or signals meant to communicate a status of the drive systems as well as, in one or more embodiments, control and/or communication of auxiliary hardware such as, e.g., window locks, sash limiters, tilt-turn devices, etc. In one or more alternative embodiments, the transceiver 592 may be configured for wireless control unit using, e.g., a smart phone or other wireless control device through any suitable wireless communication protocol (including, but not limited to: Bluetooth, ZigBee, a wireless local area network (WLAN), WiFi, RF, etc.).

The complete disclosure of the patents, patent documents, and publications identified herein are incorporated by reference in their entirety as if each were individually incorporated. To the extent there is a conflict or discrepancy between this document and the disclosure in any such incorporated document, this document will control.

Illustrative embodiments of drive systems and hinged window assemblies incorporating the drive systems are discussed herein with some possible variations described. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof. It should also be understood that this invention also may be suitably practiced in the absence of any element not specifically disclosed as necessary herein.

What is claimed is:

1. A hinged window assembly comprising:
a movable sash;
a window frame, wherein the movable sash is attached to the window frame such that the movable sash can be rotated relative to the window frame;
a linkage connected to the window frame and the movable sash; and
a drive system operably connected to the linkage, wherein the drive system and the linkage are configured to rotate the movable sash relative to the window frame, wherein the drive system comprises:
a linkage driver fixedly mounted on a drive shaft, wherein the drive shaft defines a shaft axis extending along a length of the drive shaft, wherein rotating the drive shaft about the shaft axis rotates the linkage driver about the shaft axis, and wherein rotation of the linkage driver operates the linkage such that the movable sash rotates relative to the frame;
a motor apparatus comprising an output shaft;
a motor coupling apparatus operably connected to the drive shaft and the output shaft, wherein the motor coupling apparatus comprises a selective motor coupling apparatus configured to selectively couple or decouple the output shaft and the drive shaft;
a hand crank gear fixedly attached to the drive shaft, wherein rotation of the hand crank gear about the drive shaft axis rotates the drive shaft; and
a hand crank apparatus operably connected to a drive gear, wherein the hand crank apparatus is movable between a manual configuration and a motorized configuration, wherein the drive gear engages the hand crank gear when the hand crank apparatus is in the manual configuration, and wherein the drive gear does not engage the hand crank gear when the hand crank apparatus is in the motorized configuration, and further wherein the hand crank apparatus comprises a hand crank and rotation of the hand crank about a hand crank axis rotates the drive gear about the hand crank axis, wherein the hand crank axis extends through the drive gear and when the hand crank apparatus is in the manual configuration and the hand crank is rotated about the hand crank axis, the drive gear rotates about the hand crank axis and rotates the hand crank gear, about the drive shaft axis, and wherein rotation of the hand crank gear about the drive shaft axis rotates the drive shaft and the linkage driver about the drive shaft axis.

2. A hinged window assembly according to claim 1, wherein the drive system further comprises an interlock switch operably connected to the motor coupling apparatus, wherein the interlock switch causes the selective motor coupling apparatus to couple the output shaft of the motor apparatus and the drive shaft only when the hand crank apparatus is in the motorized configuration.

3. A hinged window assembly according to claim 1, wherein movement of the hand crank apparatus from the manual configuration to the motorized configuration moves the drive gear away from the hand crank gear.

4. A hinged window assembly according to claim 1, wherein movement of the hand crank apparatus from the manual configuration to the motorized configuration moves the drive gear out of engagement with the hand crank gear along the hand crank axis.

5. A hinged window assembly according to claim 4, wherein the movement of the hand crank apparatus from the manual configuration to the motorized configuration comprises rotating the hand crank about a configuration axis, wherein the configuration axis is generally transverse to the hand crank axis.

6. A hinged window assembly according to claim 1, wherein the linkage driver comprises a worm gear.

7. A hinged window assembly according to claim 1, wherein the linkage driver comprises a lead screw.

8. A hinged window assembly according to claim 1, wherein the hand crank gear comprises a bevel gear and wherein the drive gear comprises a bevel gear operably connected to the hand crank.

9. A hinged window assembly comprising:
a movable sash;
a window frame, wherein the movable sash is attached to the window frame such that the movable sash can be rotated relative to the window frame;
a linkage connected to the window frame and the movable sash; and
a drive system operably connected to the linkage, wherein the drive system and the linkage are configured to rotate the movable sash relative to the window frame, wherein the drive system comprises:
- a linkage driver fixedly mounted on a drive shaft, wherein the drive shaft defines a shaft axis extending along a length of the drive shaft, wherein rotating the drive shaft about the shaft axis rotates the linkage driver about the shaft axis, and wherein rotation of the linkage driver operates the linkage such that the movable sash rotates relative to the frame;
- a motor apparatus comprising an output shaft;
- a motor coupling apparatus operably connected to the drive shaft and the output shaft, wherein the motor coupling apparatus comprises a selective motor coupling apparatus configured to selectively couple or decouple the output shaft and the drive shaft;
- a hand crank gear fixedly attached to the drive shaft, wherein rotation of the hand crank gear about the drive shaft axis rotates the drive shaft;
- a hand crank apparatus operably connected to a drive gear, wherein the hand crank apparatus is movable between a manual configuration and a motorized configuration, wherein the drive gear engages the hand crank gear when the hand crank apparatus is in the manual configuration, and wherein movement of the hand crank apparatus from the manual configuration to the motorized configuration moves the drive gear away from the hand crank gear such that the drive gear does not engage the hand crank gear when the hand crank apparatus is in the motorized configuration, and further wherein the hand crank apparatus comprises a hand crank and rotation of the hand crank about a hand crank axis rotates the drive gear about the hand crank axis, wherein the hand crank axis extends through the drive gear and when the hand crank apparatus is in the manual configuration and the hand crank is rotated about the hand crank axis the drive gear rotates about the hand crank axis and rotates the hand crank gear, about the drive shaft axis, and wherein rotation of the hand crank gear about the drive shaft axis rotates the drive shaft and the linkage driver about the drive shaft axis; and
- an interlock switch operably connected to the motor coupling apparatus, wherein the interlock switch causes the selective motor coupling apparatus to couple the output shaft of the motor apparatus and the drive shaft only when the hand crank apparatus is in the motorized configuration.

10. A hinged window assembly according to claim 9, wherein the movement of the hand crank apparatus from the manual configuration to the motorized configuration moves the drive gear out of engagement with the hand crank gear along the hand crank axis.

11. A hinged window assembly according to claim 9, wherein the movement of the hand crank apparatus from the manual configuration to the motorized configuration comprises rotating the hand crank about a configuration axis, wherein the configuration axis is generally transverse to the hand crank axis.

12. A hinged window assembly according to claim 9, wherein the hand crank gear comprises a bevel gear and wherein the drive gear comprises a bevel gear operably connected to the hand crank.

* * * * *